United States Patent Office
3,744,984
Patented July 10, 1973

3,744,984
PROCESS FOR THE MANUFACTURE OF FOAMED PORCELAIN-LIKE SHAPED ARTICLES
Osamu Sato, 3351 Oaza Hoshida, Katano-cho, Kitakawachi-gun, Osaka, Japan
No Drawing. Filed Apr. 5, 1971, Ser. No. 131,507
Int. Cl. C03c 3/04
U.S. Cl. 65—22                                18 Claims

ABSTRACT OF THE DISCLOSURE

A process for the manufacture of foamed porcelain-like shaped articles which comprises mixing (A) at least one aggregate component selected from the group consisting of the silicate glass powders and silicate mineral powders; (B) a water glass component; (C) an inorganic alkali salt component which generates a gas by substantially decomposing at the firing temperature; and (D) a component for adjusting the foaming temperature, said component being selected from at least one mineral powder selected from the group consisting of boric acid, borates, lead oxides and zinc white, and at least one mineral powder selected from the group consisting of the alumina compounds, magnesia compounds and calcium compounds; molding the resulting mixture; and thereafter firing and foaming the resulting shaped article at a temperature ranging between 700° and 1200° C.

---

This invention relates to a process for the manufacture of foamed porcelain-like shaped articles.

As a process for manufacturing a foamed shaped article having as its component a silicate glass powder, a method has been proposed in the past which comprises adding on the order of 0.5% of either a carbon powder or calcium carbonate to the silicate glass powder as a blowing agent, and also adding a small quantity of a powder such as of Al, Zn or Cu for inhibiting the foaming until the silicate glass softens, placing the so obtained mixture in a heat-resistant chromium-nickel-copper mold and then heating the mold to about 850° C. to render the silicate glass into a fluid state and cause the generation of $CO_2$ by the foaming of the blowing agent to thereby produce a foamed porcelain-like shape article. Another process is known wherein a blowing agent resulting from the reaction of a caustic alkali with aluminum is added to a clay slip, after which this mixture is poured into a mold of gypsum, the blowing agent is caused to foam in the mold to form minute air bubbles, which are, without defoaming, caused to solidify in the foamed state, and thereafter the foam is removed from the mold and dried, followed by firing in a furnace at an elevated temperature of above 1200° C. to produce a foamed porcelain-like shaped article which is light and possesses good heat insulation properties.

A further known process for manufacturing a foamed porcelain-like shaped article molds a clay slip to which has been added zeolite, dries the article after removing from the mold, and thereafter places the article in a furnace for heating at an elevated temperature in excess of 1200° C. to decompose the zeolite and generate a gas to effect the foaming and firing of the shaped article.

However, in these prior art processes for manufacturing foamed porcelain-like shaped articles which use the silicate glass powder as their constituent, the silicate glass flows about in the mold and adheres to the mold walls, with the consequence that a high frequency oscillator must be utilized for removing the shaped article from its mold. Again, the shaped article must be passed through a lehr for removing the strain. There is also the drawback that a glaze effect is not demonstrated even though a glaze is applied to the surface of the shaped article before its firing, since the glaze sinks into the interior of the article as a result of the motility of the silicate glass in its mold.

In addition, even in the case of firing a clay slip to which only zeolite or a caustic alkali with aluminum is added as the blowing agent, there are drawbacks such as the required firing temperature exceeding 1200° C. and the poor surface strength of the baked-on glaze even though various colors are applied by means of glazing at the time of firing.

An object of the present invention resides in solving the foregoing drawbacks and providing a process for the manufacture of foamed porcelain-like shaped articles by firing a shaped article of a composition consisting of a silicate glass powder and/or a silicate mineral powder to which have been added water glass and other materials, and forming in the shaped article a porous structure consisting of minute independent cells by means of the gas that generates during the firing of the shaped article to thus provide a foamed porcelain-like shaped article of low density and of light weight, and having properties such as low water absorbency, good form after firing, excellent surface luster, superior compressive strength and flexural strength and a wide choice of color tone as applied by means of a glaze.

Another object of the invention is to provide a process wherein, in the manufacture of a foamed porcelain-like shape article by firing a shaped article of a composition consisting of a silicate glass powder and/or a silicate mineral powder to which have been added water glass and other materials, the firing and foaming can be carried out at a temperature ranging between 700° and 1200° C., and moreover the motility of the silicate glass in the mold can be checked and a foamed porcelain-like shaped article of the desired shape can be produced.

Other objects and advantages will become apparent from the following description.

The foregoing objects can be achieved by either a procedure consisting of molding a shaped article from a mixture obtained by admixing water glass with a silicate glass powder and/or a silicate mineral powder, and firing and foaming the shaped article at a temperature ranging between 700° and 1200° C., and preferably 750° to 1000° C., or a procedure consisting of firing the foregoing mixture followed by comminution of the so fired product, admixing water glass thereto, molding a shaped article therefrom, and firing same at a temperature ranging between 700° and 1200° C., and preferably 750° to 1000° C., to effect the foaming of the as yet unfoamed component.

As the silicate glass powder which can be used in the invention process, the finely ground powders obtained in customary maner by comminution of such silicate glasses as the $Na_2O$-$CaO$-$SiO_2$ type soda-lime glass, the $K_2O$-$PbO$-$SiO_2$ type lead glass, the $Li_2O$-$Na_2O$-$K_2O$-$BaO$-$Al_2O_3$-$SiO_2$ type barium glass, the $Na_2O$-$B_2O_3$-$SiO_2$ type borosilicate glass, the $CaO$-$MgO$-$Al_2O_3$-$SiO_2$ type alumina-silicate glass, the $LiO_2$-$Al_2O_3$-$SiO_2$ type lithia-alumina-silicate glass and the $SiO_2$ type quartz glass; and used are, for example, those of particle diameter 0.004 mm. to 1.00 mm. (20 mesh), and preferably 0.008 mm. to 0.50 mm. (32 mesh). Conveniently used silicate glass powders are those of soda-lime glass, barium glass and borosilicate glass.

On the other hand the silicate mineral powders which can be used in the invention process include such silicate mineral as quartz sand, silica, olivine, garnet, petalite, beryl, cordierite, pyroxene, amphibole, talc, pyrophyllite, mica, chlorite, chrysotile, antigolite, kaolin, toseki, allophane, feldspar, aplite, zeolite, alunite, obsidianite and shale, which are used after comminution in customary manner with a mill to a fine powder, for example, of a particle diameter of 0.004 mm. to 1.00 mm. (20 mesh), and preferably 0.008 mm. to 0.50 (32 mesh). These may be in form of a calcined product. As convenient silicate mineral powders, mention can be made of the fine powders of quartz sand, silica, zeolite, toseki, feldspar and aplite. The silicate mineral powders are at times strictly classified further in the case of silica and quartz sand as silicic acid minerals and as silicate minerals. The silicate mineral powder and the silicate glass powder constitute the principal aggregates of the product, and either the silicate glass powder or the silicate mineral powder is mixed in an amount of 50 to 95 parts by weight, and preferably 60 to 90 parts by weight, per 100 parts by weight of the total components. When the silicate glass powder and the silicate mineral powder are to be used in combination, the ratio at which they are mixed is not so critical, and the silicate glass powder can be added in an amount of 20 to 400 parts by weight, and preferably 50 to 200 parts by weight, per 100 parts by weight of the silicate mineral powder. The ratio in which the two components are mixed can be suitably adjusted within the foregoing range in accordance with the properties desired in the foamed porcelain-like shaped article and the intended purpose or use of the product. When the silicate glass powder, e.g., the powder of soda-lime glass, barium glass or borosilicate glass, is used in a greater amount than the silicate mineral powder, e.g., the powder of quartz sand, silica, zeolite, toseki, feldspar or aplite, the degree of foaming tends to increase and there is also a tendency to form continuous cells. Further, the compressive strength and flexural strength of the shaped article tends to decline. Again, there is also a tendency of an increase in the rate of thermal expansion as well as a decline in the impact strength and heat resistance.

Water glass is admixed with the foregoing silicate glass powder and/or silicate mineral powder. A mixer equipped with an agitating apparatus is conveniently used for this purpose.

The water glass used in the invention process is either an alkali silicate or a concentrated aqueous solution which has as its principal component an alkali silicate. In this case the alkali used is either sodium or potassium. When the water glass used is sodium silicate, preferred compositions meet the following JIS standards.

Standards Table of Sodium Silicate in Accordance with JIS/K 1408

| Number: | Components (percent) | | Molar ratio |
|---|---|---|---|
| | $SiO_2$ | $Na_2O$ | $Na_2O:SiO_2$ |
| 1 | 36–38 | 17–18 | 1:2.1 |
| 2 | 34–36 | 14–15 | 1:2.4 |
| 3 | 28–30 | 9–10 | 1:3.05 |
| 4 | 23–25 | 6–7 | 1:3.7 |

The water glass is added in an amount of 5 to 40 parts by weight, and preferably 15 to 35 parts by weight, per 100 parts by weight of the total components. When the amount of the water glass added is less than 5 parts by weight, the binding by means of the water glass becomes inadequate, with the consequence that the molded shaped article from the foregoing mixture is friable and easily crumbles during its handling, making it unsuitable for large-scale production. On the other hand, when the water glass is added in a large amount in excess of 40 parts by weight, the mixture becomes too soft, with the consequence that it not only is easily deformed when it is being molded but also a strain is easily set up during the drying of the shaped article. Hence, the addition of the water glass in excess also makes the mixture unsuitable for large-scale production. When water glass is heated alone, it effloresces at 500° to 600° C. and results in a very minute quantity of powder. However, when water gloss is mixed with a silicate glass powder and/or a silicate mineral powder, it acts as a binding agent at room temperature to make it possible to compression mold the mixture. When it is heated to a still higher temperature in the range of 700° to 1200° C., the water glass starts to decompose and a porous structure is formed in the shaped article.

For example, when a temperature in the neighborhood of 700° C. is reached, the water glass used as a binding agent for the silicate glass powder and/or silicate mineral powder demonstrates a marked viscosity increase and, as a consequence, prevents the gas from escaping to the outside of the shaped article. In those cases where the hereinafter described inorganic alkali salts have been added, the gas that is generated by their heat decomposition and the gas that is generated as a result of the decomposition of a part of the water glass are captured inside the shaped article and prevented from escaping to the outside of the shaped article. Thus, a shaped article having a porous character and high bulk is produced as a result of the independent cells that are formed.

Then when a temperature in excess of 700° C. is reached, the silicate glass and/or silicate minerals attain a temperature at which they become meltable, with the consequence that upon initiation of their melting they attain a fluid state. However, this transition to a fluid state is checked by the water glass and, when the hereinafter described inorganic alkali salts are present, the formation of a porous structure made up of independent cells is fully accomplished by means of the gas that is generated by the heat decomposition of the inorganic alkali salts and the gas that is generated by the decomposition of a part of the water glass to thus make the formation of a high bulk article possible. Hence, although there is a movement of the silicate glass and/or silicate minerals as a result of their melting, the disintegration of the porous structure does not take place, and moreover a foamed porcelain-like shaped article having a smooth surface is obtained. Therefore, the water glass functions in the invention process as a binding agent, a blowing agent, a foam capturing agent, an independent cell formig agent and a bulking agent.

In the invention process, it is preferred to add to the silicate glass powder and/or silicate mineral powder, as a blowing agent component, an inorganic alkali salt, which generates a gas by substantially decomposing at the temperature at which the molded shaped article from the foregoing mixture is fired. On firing the shaped article within a temperature of 700° to 1200° C., the water glass generates a gas by decomposition and the alkali also generates a gas by being decomposed during the firing. As a consequence, the porous structure which results is formed more rapidly and in a more dense state to provide a shaped article of superior lightness. The inorganic alkali salts which form a gas by substantially decomposing at the firing temperature range include the inorganic sodium and potassium salts which form a gas by decomposing in the range of about 700° to 1200° C. Included as these alkali salts are the alkali salts of carbonic acid, such as $NaHCO_3$, $Na_2CO_3$, $KHCO_3$ and $K_2CO_3$; the alkali salts of sulfuric acid, such as $NaHSO_4$, $Na_2SO_4$, $KHSO_4$ and $K_2SO_4$; the alkali salts of sulfurous acid, such as $NaHSO_3$, $Na_2SO_3$, $KHSO_3$ and $K_2SO_3$; the alkali salts of thiosulfuric acid, such as $Na_2S_2O_3$ and $K_2S_2O_3$; the alkali salts of nitric acid, such as $NaNO_3$ and $KNO_3$; the alkali salts of nitrous acid, such as $NaNO_2$ and $KNO_2$; the alkali salts of phopshoric acid, such as $NaH_2PO_4$, $Na_2HPO_4$, $Na_3PO_4$, $KH_2PO_4$, $K_2HPO_4$ and $K_3PO_4$; and the alkali salts of chloric acid, such as $NaClO_3$ and $KClO_3$. The inorganic alkali salts which are particularly convenient include $NaHCO_3$, $Na_2CO_3$, $NaHSO_4$, $Na_2SO_4$ and $Na_2S_2O_3$ These alkali salts decompose during the firing and generate in all cases a gas such as $CO_2$, $SO_2$, $H_2$, $O_2$ or $NO$, 

thereby foaming the shaped article being fired to form a porous structure.

While the gas tends to escape to the outside of the shaped article during its firing, it is prevented from doing so by the concurrent melting of the outer surface of the shaped article. Therefore, the gas is confined inside the shaped article. By stopping the heating at this point, the tendency to form independent cells is enhanced and thereby takes place.

The proportion of the aforesaid alkali salt used depends upon the porous structure and degree of lightness desired as well as upon the other components that are to be admixed. When silicate mineral powder is the aggregate used, the salt is added in an amount of 10 to 30 parts by weight, and preferably 15 to 25 parts by weight, per 100 parts by weight of the total components mixed. On the other hand, when a silicate glass powder is used as the aggregate, the alkali salt is used in an amount of not more than 3 parts by weight, and preferably 0.1 to 1 part by weight. Further, when a mixture of a silicate mineral powder and a silicate glass powder is used as the aggregate, the amount used of the alkali salt is not more than 15 parts by weight and preferably 1 to 10 parts by weight.

In molding a shaped article from the mixture consisting of a silicate glass powder and/or silicate mineral powder to which water glass has been added, a mold of wood, gypsum or metal is used. After filling the mold with the mixture, a pressure, say, of 3 kg./cm.$^2$ to 250 kg./cm.$^2$, and preferably 50 to 200 kg./cm.$^2$, is applied to form the article into the shape desired.

The same procedure is employed in molding the shaped article from a mixture consisting of a silicate glass powder and/or silicate mineral powder to which has been added the aforesaid inorganic alkali salt followed by the addition of the water glass. Likewise, the same procedure is employed in molding the shaped article from a mixture consisting of a silicate glass powder to which has been added one or more mineral powder selected from the group consisting of the hereinafter described alumina compounds, magnesia compounds and calcium compounds followed by the addition of the water glass. Further a mixture consisting of a silicate mineral powder to which has been added one or more mineral powders selected from the group consisting of borax, boric acid, lead oxides and zinc white followed by the addition of water glass undergoes the same procedure.

After the shaped article is removed from its mold, the water glass hardens somewhat upon drying and, as a result, the form of the shaped article does not crumble since it possesses an adequate handling strength. This drying step is carried out in an oven in customary manner. The heating required for the drying operation is carried out at a temperature of 20° to 125° C., and preferably 40° to 70° C., for accomplishing the substantial evaporation of the water contained in the water glass. While the time period for accomplishing the drying will vary depending upon the size of the shaped article and its moisture content, a time of about 30 minutes to 6 hours is usually adequate.

After the shaped article has been substantially dried, it is then fired and foamed. However, it is preferred that the shaped article, prior to its firing and foaming, be roasted for a certain period of time until the firing temperature is attained. The temperature ranging from room temperature or the temperature of the shaped article subsequent to the hereinabove described drying step to the firing temperature will be referred to as the roasting temperature. The roasting, which is carried out for a period of time extending to the time the firing temperature is attained (this time will be referred to as the roasting time), is conveniently carried out for a period of 40 minutes to 6 hours, and preferably 2 to 5 hours. As a result of this roasting, it becomes possible to fire the entire shaped article uniformly throughout without setting up any strains during the firing. Hence, a shaped article of uniform quality can be obtained.

According to the invention process, the firing and foaming is carried out at a temperature ranging from 700° to 1200° C., and preferably 750° to 1000° C. This temperature is referred to as the firing temperature. The temperature at which the firing starts corresponds to about the temperature at which the shaped article becomes melted. At a temperature less than 700° C., the firing cannot be carried out adequately, and the procelainization of the shaped article by firing does not take place completely. Again, at a temperature less than 700° C. there is a great possibility that the foaming, which results from the decomposition of the water glass or the gas-generating inorganic alkali salts and the water glass, will not take place completely. Further, the degree of degradation of the resulting foamed porcelain-like shaped article becomes great, since there is a great possibility that it would disintegrate when submitted to a degradation test in an autoclave under an elevated temperature and a high pressure. In addition, there is the shortcoming that the desired color cannot be obtained by glazing.

On the other hand, when an elevated temperature exceeding 1200° C. is used as the firing temperature, the foaming resulting from the decomposition of the water glass or the water glass and the gas-generating inorganic alkali salts would proceed to an excess degree to make it difficult to obtain cells which are independent but would result in the joining and development into cells which are large and thus would bring about a marked decline in the strength of the resulting shaped article.

The firing time will vary depending upon the quality desired and the purpose for which the foamed poreclain-like shaped article is intended and also will vary depending upon the firing temperature, but a convenient time period ranging from 20 minutes to 5 hours, and preferably from about 30 minutes to about 3 hours is preferred.

When a silicate mineral powder and a silicate glass powder are conjointly used, the temperature range from the start of the firing to the completion thereof can be reduced by 50° C. or more by the use of the silicate glass powder as compared to when the silicate mineral powder is used alone. Thus, the temperature required for firing the shaped article can be reduced, and the temperature at which the firing is concluded and that at which the foaming is completed can be brought closer together. Thus, it becomes possible to prevent the congregation and conversion of inner cells into large-size cells or continuous cells, and the strength and quality of the fired, foamed porcelain-like shaped article can be improved.

However, in manufacturing a foamed porcelain-like shaped article from a mixture consisting of a silicate glass powder and/or silicate mineral powder to which has been added water glass, or from such a mixture to which a further addition of a gas-generating inorganic alkali salt has been made, the temperature required for carrying out adequate firing is somewhat higher than that at which the foaming is completed. Again, when a glaze is to be applied, the sintering temperature of the glaze is, at times, higher than the temperature at which the foaming is completed.

Thus, there arises the case wherein the temperature at which the firing is concluded or that in which the sintering of the glaze is completed and that at which the foaming is completed are not compatible. Hence, it becomes necessary either to carry out the firing further at an elevated temperature after completion of the foaming or to continue the heating for the purposes of sintering the glaze. In consequence, the inner cells either congregate and become large-size cells or tend to become continuous cells. Hence, the inner cells of the fired article become soft and collapse to result in a marked decline in the strength and quality of the resulting foamed porcelain-like shaped article.

As a solution to the foregoing drawback, the following procedure is employed. The foaming is completed at a temperature close to that at which the firing of the shaped article can be fully effected or close to that at which the sintering of the glaze can be accomplished. This is accomplished by the addition to the silicate glass powder and/or silicate mineral powder of at least one mineral powder selected from the group consisting of the alumina compounds, magnesia compounds and calcium compounds. As a result of this step the enlargement of the cells which are formed by the foaming is prevented, and a decline in the strength and quality of the shaped article as a result of the softening or collapse of the cells is also prevented.

The addition of the foregoing mineral powder not only raises the temperature at which the foaming starts but also by becoming an aggregate increases the strength of the resulting shaped article. Further, the thermal expansivity is lowered with the result that cracks after the firing due to rapid heating and cooling are prevented, and the so-called spalling phenomenon does not occur. Hence, a marked improvement is had in the resistance to spalling of the shaped article obtained. Therefore, when the foamed porcelain-like shaped article is made, for example, into sheet form and used for building purposes such as a tile, a product excelling in heat resistance, which can prevent the appearance of cracks in the case of fire, can be obtained.

On the other hand, in the opposite case, i.e. where the foamed porcelain-like shaped article is to be made from a mixture consisting of a silicate glass powder and/or silicate mineral powder to which water glass has been admixed, or the case where to the so obtained mixture is further added a gas-generating inorganic alkali salt, there are instances where the temperature at which the foaming is completed is higher than that at which the firing is fully accomplished. In cases such as this, the enlargement of the cells in the shaped article by their congregation or formation of continuous cells can be prevented and the strength and quality of the shaped article obtained by firing can be improved by lowering the temperature at which the initiation of the foaming due to the decomposition of a part of the water glass and the foaming due to the decomposition of the inorganic alkali salt take place.

As suitable mineral powders to be added to the silicate mineral powder and silicate glass powder for raising the temperature at which the foaming starts, are the alumina compounds, magnesia compounds and calcium compounds. The alumina compounds include burnt alumina ($Al_2O_3$), fused alumina ($Al_2O_3$), diaspore $$(\alpha\text{-}Al_2O_3 \cdot H_2O),$$

boehmite ($\gamma\text{-}Al_2O_3 \cdot H_2O$) and hydrargillite $$(\gamma\text{-}Al_2O_3 \cdot H_2O)$$

The magnesia compounds include magnesite ($MgCO_3$), brucite ($Mg(OH_2)$), magnesia clinker (MgO) and spinel ($MgO \cdot Al_2O_3$). And as the useable calcium compounds can be mentioned dolomite ($MgCO_3 \cdot CaCO_3$), dolomite clinker ($MgO \cdot CaO$), calcite ($CaCO_3$) and gypsum ($CaSO_4 \cdot 2H_2O$).

On the other hand, suitable mineral powders to be added to the silicate mineral powder and/or silicate glass powder for lowering the foaming temperature, included the tetraborates or metaborates such as, for example, the sodium salt (borax), potassium salt, magnesium salt and calcium salt; boric acid; the lead oxides such as, for example, PbO, $Pb_3O_4$, $Pb_2O_3$, $PbO_2$, $2PbCO_3 \cdot Pb(OH)_3$ and zinc white. The use of at least one from the foregoing group of mineral powders is effective in lowering the foaming temperature.

Hence, it is to be understood that in the invention process the mineral powders selected from the group consisting of the alumina compounds, magnesia compounds and calcium compounds, and the mineral powders selected from the group consisting of boric acid, borates, lead oxides and zinc white serve as agents for adjusting the foam initiation temperature. Of these mineral powders, particularly to be preferred are the alumina compounds and borax.

These mineral powders, which are added to the silicate mineral powders and/or silicate glass powders for raising the foam initiation temperature, are added in an amount of 0.1 to 9 parts by weight, and preferably 0.2 to 6 parts by weight, per 100 parts by weight of the total components. On the other hand, the mineral powders, which are used to lower the foaming temperature, are added in an amount of 0.1 to 25 parts by weight, and preferably 2 to 20 parts by weight, per 100 parts by weight of the total components.

The foamed porcelain-like shaped article, which has been obtained by firing and foaming in the manner described here inabove, is then cooled by standing at ambient temperatures or by other means.

In carrying out the firing and foaming of the shaped article, which has been dried so as to accomplished the evaporation of the water contained in the water glass, a firing furnace is conveniently employed. The firing furnace may be one whose means of heating is by either electricity or the burning of a gas or heavy oil. When the furnace is one in which the heating is by means of gas or heavy oil, the design of the furnace may be either that in which the flame is directed laterally, downwardly or upwardly. Further, the furnace may be one having an adjustable inside temperature in which both preheating and firing can be carried out; or a rotary type furnace which has in succession a preheating zone, a firing zone and a cooling zone, wherein the shaped article is conveyed progressively through these zones; or the furnace may be of the tunnel type.

The various modes of the invention process just described include one embodiment comprising admixing water glass with the silicate glass powder and/or silicate mineral powder, molding the shaped article, and thereafter firing the shaped article at 700° to 1200° C., another embodiment comprising adding an inorganic alkali salt to the silicate glass powder and/or silicate mineral powder, then adding water glass, followed by mixing the mixture and molding a shaped article therefrom, and thereafter firing the shaped article at 700° to 1200° C., a further embodiment comprising adding to the silicate glass powder and/or silicate mineral powder at least one mineral powder selected from the group consisting of the alumina compounds, magnesia compounds and calcium compounds, then adding water and mixing the mixture, molding a shaped article from the resulting mixture, and thereafter firing the shaped article at 700° to 1200° C., and an additional embodiment comprising adding to the silicate glass powder and/or silicate mineral powder at least one mineral powder selected from the group consisting of boric acid, borates, lead oxides and zinc white, then adding water glass, followed by mixing the mixture and molding a shaped article therefrom, and thereafter firing the shaped article at 700° to 1200° C. In each of these embodiments there are instances in which nonuniformity in the size of the cells occur, open cells are formed and products are produced which are unsatisfactory in strength and water absorption characteristics even though the products possess excellent lightweight property.

Hence, for obtaining a product whose cell size is more uniform and in which the number of cells opening to the surface of the shaped article is decreased, as well as for obtaining a satisfactory products in regard to not only lightness but also strength and water absorption characteristics, the foamed porcelain-like shaped article, which has been obtained after undergoing the firing step, is comminuted and remolded after adding water glass to the so obtained powder followed by remolding of the shaped article and again firing it to thus re-initiate the foaming of that portion which had been left unfoamed as a result of the reaction having been interrupted at an intermediate point in the previous foaming step.

Since in this case the fusion of the mixture proceeds to a greater degree as a result of its having been once melted in the previous step, each of the minutely divided particles become minute foams, and a tendency to the formation of independent cells is enhanced. In this case, the cellular rate declines and the density also becomes somewhat higher as a result of the cells becoming more minute, but as water absorption, compressive strength and flexural strength properties are excellent. In addition, the porcelainization of the foamed porcelain-like shaped article obtained by firing takes place completely to provide a product having excellent luster.

In a case, such as hereinabove described, where a foamed porcelain-like shaped article, which has been once fired, is comminuted and used again in molding a shaped article, the water glass to be added to the so comminuted particle is added in an amount of 5 to 30 parts by weight based on 100 parts by weight of the total components consisting of the comminuted particles and the water glass. Further, the total content of the water glass per 100 parts by weight of the total components is so controlled that it is in the range of 5 to 40 parts by weight. The same conditions used in the first firing apply to the second firing and include the drying step, roasting temperature and time, firing temperature and time and the degree of comminution of the foamed porcelain-like shaped article.

The foamed porcelain-like shaped article obtained in accordance with the present invention has a small density, and not only is its water absorption small but it also excels in its compressive strength as well as flexural strength. Since it can be molded into various forms, it can be used for constructional purposes such as flooring and wall and ceiling materials, as well as such various uses as a kitchen table, sink, tablewares and decorative items.

The following examples are given for further illustration of the invention. Unless otherwise indicated, the parts indicated in the examples are on a weight basis. The mesh number used is in all cases the Tyler mesh number. The roasting temperature (° C.) of —900 and roasting time (hr.:min.) of 1:30 denote that the temperature was raised from room temperature to 900° C. during a time period of 1 hour and 30 minutes, while a roasting temperature (° C.) of 400–800 means that the temperature was raised from 400° C. to 800° C. The examples having a corresponding number but with the prime symbol (e.g. Example 20′ as that corresponding to Example 20) illustrates the case where the product obtained in the correspondingly numbered example is comminuted and of particle size passing a Tyler mesh of mesh size 0.061 mm. [e.g. product of Example 15 (comminuted)] is used, which is then kneaded with 40% of liquid water glass No. 2 and thereafter molded, dried and fired as in Example 7.

The measurements of the water absorption, compressive strength and flexural strength in the examples were made in the following manner.

Method of measuring the water absorption JIS R 2205 (1958).

(1) Dry weight.—The sample is dried in an air bath of 105–120° C., and when a constant weight is reached, this is designated the dry weight $W_1$ (g.).

(2) Method of saturation with water.—After obtaining the dry weight, the sample is submerged in water, boiled for more than 3 hours and cooled to room temperature. The so obtained sample is used as the water-saturated sample. If desired cooling may be accomplished by the addition of water.

(3) Weight of water-saturated sample.—The water-saturated sample is removed from the water, removed of its water drops by wiping its surface with a damp cloth, and thereafter weighed. This weight is designated the weight of the water-saturated sample $W_2$ (g.).

Remarks.—The damp cloth is one which has been wrung after thorough soaking in water.

The weight is measured accurately to 1 gram.

The equation for calculating the water absorption is as follows:

$$\text{Water absorption (percent)} = \frac{W_2 - W_1}{W_1} \times 100$$

Method of measuring the compressive strength JIS R 2206 (1958).

(A) Sample

Three test pieces of cubic form having a edge of about 60 mm. are prepared from the sample to be tested, ensuring that the test pieces have, if at all possible, at least as one of their sides a fired side of the sample.

(2) The test piece must in all cases be one whose top and bottom surfaces to which pressure is to be applied are in parallel and sufficiently flat and smooth.

(B) Operation (1) The test pieces are dried at 105–120° C. to a constant weight before they are tested.

(2) The surface of the side of the test piece to which pressure is to be applied is measured in advance of the test and, if necessary, a piece of paper or the like is placed between the pressure member and the side to which pressure is to be applied to ensure that pressure is uniformly applied.

(3) A standard compressive speed of 10–15 kg./cm.² per second is employed, and the maximum load W (kg.) at which the test piece is crushed is determined.

(C) Calculation

The compressive strength is calculated by the following equation, values below 1 kg./cm.² being discarded.

$$\text{Compressive strength (kg./cm.}^2\text{)} = \frac{W \text{ (kg.)}}{A \text{ (cm.}^2\text{)}}$$

wherein W=maximum load (kg.) and A=area (cm.²) to which pressure is applied.

(D) Report

The calculated values obtained on testing the three test pieces cut from the sample are averaged, and the so obtained average is designated the compressive strength (kg./cm.²).

Method of measuring the flexural strength JIS R 2653.

(A) Sample (1) Three test pieces having a width of about 2 cm., a thickness of above 2 cm. and a length of about 7 cm. are prepared from the sample to be tested, ensuring that the test pieces have, if at all possible, at least as one of their sides a molded side of the sample.

(2) The test piece must in all cases be one whose top and bottom surface to which pressure is to be applied are in parallel and sufficiently flat and smooth.

(B) Flexural strength measuring apparatus (1) A double lever type tester is used for determining the flexural strength.

(2) The flexural strength measuring apparatus has a capacity of 500 kg. with a tolerance of ±1/500.

(3) The loading and supporting rolls are made of tempered steel of a hardness of above shore 70.

(4) The dimensions of the loading and supporting attachments are as indicated in the following table.

| | Dimension (mm.) | Tolerance (mm.) |
|---|---|---|
| Diameter of loading roll | 8 | ±0.5 |
| Diameter of supporting rolls | 8 | ±0.5 |
| Distance between the centers of the supporting rolls | 60 | ±0.2 |
| Thickness of the supporting frame | 25 | ±1 |
| Width of the supporting frame | 20 | ±1 |

(5) The loading roll and the supporting are disposed in parallel to each other, and the loading roll is equidistant from the left and right supporting rolls.

(6) The top supporting point of the supporting frame is made of tempered steel.

(7) The flexural strength measuring apparatus is so designed that the application of load is stopped simultaneously with the severance of the test piece.

(8) The flexural strength measuring apparatus is installed with the supports upright and the center-line of the lever horizontal so that the force acts at right angles to the lever.

(C) Measurement method

The flexural strength is measured by applying a load to the middle of that surface of test piece which was at the outside when it was molded, and the maximum load that the piece withstands is determined.

(D) Calculation

The flexural strength (kg./cm.$^2$) Tr is calculated by the following equation:

$$Tr = \frac{3Wl}{2bd^2}$$

wherein

W = maximum load (kg.)
l = distance between supporting points
b = width of test piece (cm.)
d = thickness of test piece (cm.)

(E) Report

The average of the calculated values of the three test pieces is reported.

EXAMPLE 1

| | Parts |
|---|---|
| Finely divided soda-lime glass | 100 |
| Water glass (JIS Standard Product No. 3) | 20 |

The foregoing components were kneaded with a kneader, after which the mixture was placed in a wooden mold and compression molded into a sheet 130 x 250 x 12 mm. The finely divided soda-lime glass used was one obtained by comminuting a soda-lime glass sheet for 24 hours in a dry-type vibratory mill and passing a 150-mesh screen.

The so obtained compression molded sheet was dried for 2 hours in a 65° C. electric oven, and the form and strength of the sheet was stabilized as a result of the drying of the water glass. The sheet was then taken out from the electric oven and to its surface was applied a glaze, following which it was again dried for 30 minutes.

The glazed sheet was then placed in a firing furnace and gradually heated up to 850° C. during a period of 2 hours. While the firing of the sheet takes place by heating the sheet to above 700° C., the foaming of the water glass contained in the sheet begins at 750° C. and is most active at 850° C. The heating was continued for a further 50 minutes at 850° C. to complete the foaming and accomplish the thorough firing of the sheet.

After completion of the foaming, the heating was discontinued and the foamed porcelain-like shaped article was withdrawn from the firing furnace and allowed to cool naturally. Thus a porous structure was formed and a fired, foamed porcelain-like shaped article was obtained.

In this example, it is also possible to add a small amount of soda ash to the foregoing components and thus adjust the amount of gas foamed during the firing.

The foamed porcelain-like shaped article made in accordance with this example had a density of 0.76, a water absorption of 0.41% and did not disintegrate even though it was held for 1 hour in an autoclave whose pressure was 10 kg./cm.$^2$. Further, its compressive strength was 98 kg./cm.$^2$ and flexural strength was 51 kg./cm.$^2$. Thus, a product excelling as a constructional material was obtained.

EXAMPLE 2

| | Parts |
|---|---|
| Finely divided borosilicate glass | 98 |
| Soda ash | 2 |

The foregoing components were stirred and mixed in a kneader, after which 8 parts of water glass (JIS Standard Product No. 3) was added and kneaded therein.

The mixture was introduced into a mold which was designed to carry out the molding by pressing with a hydraulic press. A sheet having the dimensions of 100 x 100 x 10 mm. was formed by holding the mixture in this mold for 2 minutes at a pressure of 5 kg./cm.$^2$.

The so obtained sheet was dried for 45 minutes in a 120° C. drying oven.

Next, the so obtained sheet was placed in an electric furnace preheated to 400° C., after which the temperature of the furnace was raised to 1100° C. during a period of 2 hours, followed by maintaining this temperature for 25 minutes to complete the foam and accomplish the thorough firing of the sheet.

The so obtained porous structure-containing fired, foamed porcelain-like shaped article had a density of 0.79, a water absorption of 4.1% and a compressive strength of 82 kg./cm.$^2$. Further, a test of its strength was carried out by holding it for 1 hour in an autoclave whose pressure was 10 kg./cm.$^2$, but no abnormalities with respect to its strength and other properties were noted.

EXAMPLE 3

| | Parts |
|---|---|
| Finely divided soda-lime glass | 58 |
| Finely divided petalite | 42 |

After mixing the foregoing components with stirring, 25 parts of water glass (JIS Standard Product No. 3) was added, after which the mixture was kneaded, then broken up by passing through an 8-mesh screen and thereafter packed in a receptacle, which was placed in an electric furnace where the mixture was roasted by maintaining a temperature of 450° C. for 40 minutes. After removal from the electric furnace and cooling, the mixture was rendered into finely divided particles having a particle diameter of less than 30 mesh, i.e., granules which could be readily charged to molds. 89 parts of the so obtained finely divided particles, 9 parts of finely divided toseki comminuted with a grinder and 2 parts of soda ash were mixed with stirring followed by kneading in 25 parts water glass (JIS Standard Product No. 3). This mixture was then passed through an 8-mesh screen.

The so obtained mixture was placed in a mold preheated to 120° C. and molded by applying a pressure of kg./cm.$^2$ with a hydraulic press for 2 minutes followed by removal from the mold to obtain a sheet having the dimensions of 185 x 380 x 10 mm. After cooling the sheet for 10 minutes, it was roasted by raising the temperature to 500° C. during a period of 1 hour and 50 minutes.

Next, a color glaze was applied to the surface of the sheet by spraying, following which it was placed in a receptacle and placed in a tunnel type firing furnace in which the heating was accomplished by means of the burning of heavy oil. The heating of the sheet was gradually carried out while it traveled from one end of the tunnel type firing furnace to its other end. The sheet, on entering the tunnel type firing furnace, was first heated at 300° C. in a roasting zone and, as it gradually proceeded, the temperature was raised to 870° C. firing zone, the sheet was held here for a period of 1 hour and 30 minutes.

While the foaming of the sheet started in the roasting zone while the temperature was being raised, it was completed by the heating that took place in the firing zone, with the consequence that the resulting sheet becomes porous. Further, the thorough firing of the sheet was accomplished by heating in the firing zone and, in addition, the color glaze became baked on by heating in this zone to develop the color desired. After the fired sheet was cooled by passing it through a cooling zone, it was withdrawn from the firing furnace.

The so obtained foamed porcelain-like shaped article had the dimensions of 190 x 390 x 12 mm., a density of 0.91, a water absorption of 17%, a compressive strength of 85 kg./cm.$^2$ and a flexural strength of 103 kg./cm.$^2$. Further, when its strength was tested by holding it in an autoclave whose pressure was 13 kg./cm.$^2$ for 1 hour at 190° C., there was observed no abnormalities in its dimensions or strength.

EXAMPLE 4

|  | Parts |
|---|---|
| Quartz sand (below 60 mesh) | 58 |
| Soda ash | 16 |
| Glauber's salt | 4 |
| Lime stone (below 60 mesh) | 12 |
| Dolomite (below 60 mesh) | 10 |

A mixture obtained by mixing the foregoing components in a mixer was introduced into a gas furnace and vitrified by burning. The resulting glass was then withdrawn from the gas furnace and, after cooling, was comminuted in a wet ball mill to a fine powder of below 150 mesh.

Eighty parts of the so obtained silicate glass powder and 20 parts of aplite (below 150 mesh) were mixed, followed by the addition thereto of 30 parts of water glass (JIS Standard Product No. 3) and kneading together of the mixture.

The so obtained mixture was placed in a wooden mold and compression molded into a sheet having the dimensions of 130 x 250 x 12 mm.

Next, this sheet was dried for 2 hours in a 65° C. electric oven, thereby stabilizing the form and strength of the sheet as a result of the drying of the water glass. After withdrawing the sheet from the electric oven and spraying its one side with a selenic frit glaze, it was again dried for 30 minutes at 65° C. and thereafter placed on a shelf and an alumina coating was applied before being conveyed into a tunnel type firing furnace heated by the burning of heavy oil.

The shelved sheet was gradually heated while traveling through the tunnel type firing furnace from its one end to the other, a time period of 1 hour being required for the temperature to be raised to 650° C. in the roasting zone where the sheet was held for 30 minutes at this temperature. This was followed by firing the sheet in the firing zone where the temperature was raised to 850° C. during a period of 30 minutes.

While the foaming of the sheet started during the time that the temperature was raised from 650° to 850° C., the foaming took place most fully during the time the firing was carried out by heating the sheet at 850° C. When the temperature of 850° C. was maintained for 50 minutes, the foaming was brought to completion and the thorough firing of the sheet was also accomplished.

Thus a fired, foamed porcelain-like shaped article having a porous structure was obtained. The foamed porcelain-like shaped article was then moved to the cooling zone of the firing furnace and cooled by blowing cooling air against it, and thereafter withdrawn from the furnace.

The foamed porcelain-like shaped article made in accordance with this example had a density of 0.84, a water absorption of 0.43%, and no abnormalities were noted as to its form and strength when it was held for 1 hour in an autoclave whose pressure was 10 kg./cm.$^2$. Further, it had a compressive strength of 107 kg./cm.$^2$ and a flexural strength of 59 kg./cm.$^2$. It was conveniently useable for such purposes as constructional materials and tiling such as for sinks.

EXAMPLE 5

|  | Parts |
|---|---|
| Quartz sand powder (below 150 mesh) | 75 |
| Borax powder (below 150 mesh) | 25 |

After stirring and mixing the foregoing components in a mixer, 30 parts of water glass (JIS Standard Product No. 3) was added and kneaded therewith. The resulting mixture was then placed in a mold and compression molded to a sheet 100 x 100 x 10 mm. The so obtained sheet was placed in a drying oven and dried for 30 minutes at a temperature of 120° C. This was followed by placing the sheet in a firing furnace and heating for 45 minutes at 800° C. to effect the firing and foaming of the sheet.

Thus, a fired, foamed porcelain-like shaped article having a porous structure was obtained.

EXAMPLE 6

|  | Parts |
|---|---|
| Finely divided soda-lime glass | 50 |
| Finely divided toseki | 5 |
| Finely divided aplite | 41 |
| Soda ash | 4 |

The foregoing components were mixed, follower by the admixture therewith of 20 parts of water glass (JIS Standard Product No. 3). The mixture was then placed in a mold preheated to 120° C. and molded into a sheet having the dimensions of 180 x 380 x 7 mm. while applying pressure. When the surface of the so obtained sheet became hardened by drying of the water glass, it became a strong sheet.

Next, after drying this sheet by allowing it to stand for 2 hours in a room whose temperature was 30° C., a color glaze was applied its surface by spraying.

This was followed by immediately placing the sheet in a firing furnace designed to burn heavy oil. The temperature of the furnace was then raised up to 650° C. during a period of 1 hour. While maintaining this temperature the temperature gradient inside the furnace was eliminated, and thereafter a further raise in the temperature to 900° C. was made during a period of 30 minutes.

The foaming started at 780° C. By maintaining the temperature at 900° C. for 50 minutes, not only the foaming of the sheet was completed but also its thorough firing was accomplished.

The color glaze was melted and baked on.

The resistance to spalling was improved by cooling the fired sheet to room temperature during a 4-hour period after completion of the firing.

Thus, the porous structure was formed and a fired, foamed porcelain-like shaped article was obtained.

The so obtained foamed poreclain-like shaped article had a density of 0.81, a water absorption of 0.4%, a compressive strength of 114 kg./cm.$^2$ and a flexural strength of 62 kg./cm.$^2$. Further, when it was held for 1 hour in an autoclave whose pressure was 10 kg./cm.$^2$, no abnormalities in its form or strength were noted.

EXAMPLE 7

|  | Parts |
|---|---|
| Quartz sand powder (below 150 mesh) | 70 |
| Borax powder (below 150 mesh) | 20 |
| Soda ash | 10 |

After stirring and mixing the foregoing components in a kneader, 30 parts of water glass (JIS Standard Product No. 3) was added and kneaded therewith. The resulting mixture was placed in a mold and compression molded to a sheet 100 x 100 x 10 mm. The so obtained sheet was then placed in a drying oven and dried for 30 minutes at a temperature of 120° C.

This was followed by placing the sheet in a firing furnace, where it was fired and foamed by heating at 800° C. for 45 minutes.

Thus, a fired, foamed porcelain-like shaped article of sheet form having a porous structure was obtained.

EXAMPLE 8

|  | Parts |
|---|---|
| Zeolite | 75 |
| Soda ash | 25 |

After mixing the foregoing components with stirring, 25 parts of water glass (JIS Standard Product No. 3) was added and knead therewith. The mixture was then compression molded into a block 100 x 100 x 100 mm. The resulting block was then placed in a drying oven and dried for 40 minutes at 100° C.

This was followed by placing the dried block in a firing furnace where the temperature was raised to 850° C. during a period of 1 hour, followed by maintaining this temperature for 40 minutes to complete the firing. Thus, a fired, foamed poreclain-like shaped articles of block form having a porous structure was obtained. The so obtained shaped article had a density of 0.80 and a compressive strength of 58 kg./cm.$^2$.

Next, the foregoing foamed porcelain-like shaped article was comminuted to particles of below 24 mesh, and to 100 parts of this fine powder was added 20 parts of water glass and kneaded together. The resulting mixture was then placed in a mold and molded into a sheet having the dimensions of 100 x 100 x 10 mm. followed by drying same by heating at 125° C. in a drying oven.

This was followed by placing the dried sheet in a firing furnace where the temperature was first raised up to 800° C. during a period of 1 hour, following by heating the sheet for 30 minutes at 850° C. to thereby accomplish the complete foaming and thorough firing of the sheet.

After completion of the firing, the sheet was cooled to 600° C. during a period of 1 hour, then allowed to cool for another hour by opening the furnace, and thereafter withdrawn from the furnace. The so obtained foamed porcelain-like shaped article had a compressive strength of 90 kg./cm.$^2$, a flexural strength of 75 kg./cm.$^2$, a water absorption of 0% and a density of 1.1.

EXAMPLE 9

| | Parts |
|---|---|
| Finely divided quartz said (below 150 mesh) | 75 |
| Soda ash | 25 |

The foregoing components were stirred and mixed in a kneader, and thereafter 30 parts of water glass (JIS Standard Porducts No. 3) was added and kneaded therewith. The resulting mixture was then placed in a mold and compression molded to a sheet 100 x 100 x 10 mm. This sheet was then placed in a drying oven and dried for 30 minutes at a temperature of 120° C., after which it was conveyed into a firing furnace where it was fired by heating for 45 minutes at 900° C.

Thus, a fired, foamed poreclain-like shaped article of sheet form having a porous structure was obtained. The so obtained foamed porcelain-like shaped article had a density of 0.98 and a compressive strength of 69 kg./cm.$^2$. The so obtained foamed porcelain-like shaped article was then comminuted to particle size of below 24 mesh, after which 25 parts of water glass was added to 100 parts by weight of the so comminuted product and kneaded therewith. The resulating mixture was the compression molded into a square sheet 100 x 100 x 10 mm. and dried for 45 minutes in a 120° C. drying oven.

Next, after placing the dried sheet in a firing furnace preheated to 400° C., the temperature was raised to 950° C. during a period of 1 hour and 30 minutes, followed by carrying out the firing of the sheet by heating at 950° C. for 30 minutes to thereby effect the complete foaming of the shaped article and its thorough firing. After completion of the firing, the sheet was cooled to 600° C. during a period of 1 hour, followed by opening the furnace and allowing it to cool for another hour, after which it was withdrawn from the furnace.

The so obtained foamed porcelain-like shaped article had a compressive strength of 75 kg./cm.$^2$, a flexural strength of 57 kg./cm.$^2$, a water absorption of 4% and a density of 0.85, and its luster was satisfactory.

EXAMPLE 10

| | Parts |
|---|---|
| Finely divided soda-lime glass | 30 |
| Toseki (below 150 mesh) | 60 |
| Soda ash | 10 |

After stirring and mixing the foregoing components in a kneader, 30 parts of water glass (JIS Standard Product No. 3) was added and kneaded therewith. The resulting mixture was placed in a mold and compression molded into a block 100 x 100 x 100 mm., followed by drying the resulting block for 45 minutes at 120° C. in a drying oven.

Next, the dried block was placed in an electric furnace preheated to 400° C. and the temperature of the furnace was raised to 900° C. during a period of 1.5 hours, followed by maintaining this temperature for 30 minutes to carry out the firing of the block.

Thus, a fired, foamed porcelain-like shaped article having a porous structure was obtained. The so obtained foamed porcelain-like shaped article of block form had a density of 0.71, a water absorption of 3.7% and a compressive strength of 62 kg./cm.$^2$.

The foregoing shaped article was then comminuted to particle size of below 30 mesh, and to 100 parts thereof were added 30 parts of water glass (JIS Standard Product No. 3) and kneaded therewith. The resulting mixture was then placed in a mold and molded into a sheet having the dimensions of 100 x 100 x 10 mm.

The so obtained sheet was placed in a drying oven and dried for 40 minutes at 120° C.

Next, the sheet was placed in a firing furnace which had been preheated to 400° C., and after the temperature was raised up to 750° C. during a 1-hour period, the firing was carried out by heating the sheet for 1 hour at 750° C. and for 20 minutes at 800° C. Thus, the foaming of the sheet was completed and its thorough firing was accomplished.

After completion of the firing, the sheet was cooled to 600° C. during a 1-hour period, followed by opening the furnace and cooling for another hour, after which the sheet was withdrawn from the furnace.

The so obtained shaped article had a compressive strength of 78 kg./cm.$^2$, a flexural strength of 49 kg./cm.$^2$, a water absorption of 2.8% and a density of 0.78, and its appearance was white and surface luster was good.

EXAMPLE 11

| | Parts |
|---|---|
| Zeolite (below 64 mesh) | 55 |
| Aplite (below 80 mesh) | 20 |
| Soda ash | 25 |

Thirty-five parts of water glass (JIS Standard Product No. 3) was added to the foregoing components, and the mixture was kneaded together. The resulting mixture was then compression molded into a block 100 x 100 x 100 mm., after which the block obtained was dried for 45 minutes at 125° C. in a drying oven. This was followed by placing the block in an electric furnace preheated to 400° C. The temperature of the furnace was then raised to 900° C. during a 90-minute period, after which the firing was carried out by maintaining this temperature for 30 minutes. This, a shaped article having a compressive strength of 61 kg./cm.$^2$ and a density of 0.69 was obtained.

The so obtained foamed porcelain-like shaped article was then comminuted to particle size of below 24 mesh, and 30 parts of water glass (JIS Standard Product No. 3) was added to 100 parts thereof and kneaded therewith. The resulting mixture was then compression molded into a square sheet 100 x 100 x 10 mm. and dried for 40 minutes at 120° C. in a drying oven.

Next, the dried sheet was placed in an electric furnace preheated at 400° C., followed by raising the furnace temperature to 750° C. during a period of 60 minutes. The firing and foaming of the sheet was accomplished by maintaining the temperature of 750° C. for a further 60 minutes and a temperature of 800° C. for 30 minutes. After completion of the firing of the sheet, the temperature was gradually cooled to 600° C. during a period of 60 minutes, followed by opening the furnace and allowing the sheet to cool for a further 60 minutes, after which it was withdrawn from the furnace.

The so obtained foamed porcelain-like shaped article had a compressive strength of 78 kg./cm.², a flexural strength of 59 kg./cm.², a water absorption of 3% and a density of 0.64. The product's appearance was white and its surface luster was good.

EXAMPLE 12

| | Parts |
|---|---|
| Finely divided barium glass (below 150 mesh) | 45 |
| Finely divided feldspar (below 150 mesh) | 50 |
| Finely divided fused alumina (below 220 mesh) | 5 |

The foregoing components were stirred and mixed in a kneader, after which 30 parts of water glass (JIS Standard Product No. 3) was added and kneaded therewith. The mixture was then placed in a mold and compression molded into a sheet 100 x 100 x 10 mm., followed by drying same for 1.5 hours at 60° C. in a drying oven.

The sheet was then placed in an electric furnace. The temperature of the furnace was raised to 960° C. during a 3-hour period, at which temperature the heating of the sheet was carried out for a further 30 minutes to accomplish the firing and foaming of the sheet.

Thus, a foamed porcelain-like shaped article of sheet form having a porous structure was obtained. The so obtained product had a density of 0.93, a compressive strength of 73 kg./cm.², a flexural strength of 55 kg./cm.² and a water absorption of 3.4%.

EXAMPLE 13

| | Parts |
|---|---|
| Finely divided soda-lime-magnesia glass (below 150 mesh) | 93.5 |
| Finely divided magnesia clinkers (below 220 mesh) | 6.0 |
| Sodium sulfate | 0.5 |

After stirring and mixing the foregoing components in a kneader, 12 parts of water glass (JIS Standard Product No. 3) was added and kneaded therewith. The resulting mixture was placed in a mold and molded with a pressure of 50 kg./cm.² into a sheet having the dimensions of 100 x 100 x 10 mm. The sheet was then placed in a 50° C. drying oven and dried for 2 hours.

Next, the sheet was placed in an electric furnace, whose temperature was raised to 830° C. during a period of 2 hours, followed by maintaining this temperature for a further 35 minutes to complete the foaming as well as thorough firing of the sheet.

The so obtained fired, foamed porcelain-like shaped article having a porous structure had a denstiy of 0.86, a water absorption of 2.8% and a compressive strength of 58 kg./cm.². Further, when a test of its strength was carried out by holding it for 1 hour in an autoclave whose pressure was 10 kg./cm.², no abnormalities as to its strength and other properties were noted.

EXAMPLE 14

| | Percent |
|---|---|
| Finely divided soda-potash-lime glass (below 150 mesh) | 45.0 |
| Finely divided silica (below 150 mesh) | 20.0 |
| Finely divided toseki (below 150 mesh) | 30.0 |
| Borax | 3.5 |
| Sodium carbonate | 1.5 |

A mixture obtained by kneading 30 parts of water glass (JIS Standard Product No. 3) with the foregoing components was compression molded into a block 200 x 200 x 100 mm. The so obtained block was then dried in a drying oven for 6 hours at 70° C. This was followed by placing the block in a firing furnace, raising the temperature of the furnace up to 900° C. during a period of 4 hours, and firing the block by maintaining this temperature for 2 hours.

The so obtained foamed porcelain-like shaped article had a compressive strength of 49 kg./cm.² and a density of 0.73. This shaped article was then comminuted to particle size of below 24 mesh, following which 25 parts of a water glass consisting of 80 parts of a water glass (JIS Standard Product No. 3) and 20 parts of a water glass (JIS Standard Product No. 2) was kneaded with 100 parts of the foregoing comminuted product. The so obtained mixture was then compression molded into a square sheet 100 x 100 x 10 mm., followed by drying the so obtained sheet in a drying oven for 1 hour at 80° C. This was followed by placing the sheet in an electric furnace, raising the temperature of the furnace up to 850° C. during a period of 1.5 hours, and firing the sheet at this temperature for 1 hour thereby completing the foaming of the sheet as well. After completion of the firing, the sheet was allowed to stand and gradually become cooled to 100° C. during a period of 6 hours, following which the door of the furnace was opened to allow its further cooling for 30 minutes. The sheet was then withdrawn from the furnace. The so obtained foamed porcelain-like shaped article had a compressive strength of 60 kg./cm.², a flexural strength of 62 kg./cm.², a water absorption of 3.2% and a density of 0.75. It was white in appearance and its surface had a good luster.

EXAMPLES 15–28

Petalite, soda-lime glass and water glass (No. 3) were used as the principal components, and the experiments were carried out as in Example 7 except that the inorganic alkali salt component for generating the gas and the component for adjusting the foaming temperature that were used, and the roasting temperature and time and firing temperature and time employed were as indicated in Table I, below.

EXAMPLES 29–34

In the starting material makeup, the same components were used, varying however the inorganic alkali salt component. The experiments were carried out as in Example 7, except that the roasting temperature and time and the firing temperature and time indicated in the hereinafter given Table II were used.

EXAMPLES 35–37

In the starting material makeup, equal amounts of petalite, soda-lime glass, zinc white and water glass (No. 3) were used, the inorganic alkali salt component being varied, however, as shown in the hereinafter given Table III. The experiments were carried out as in Example 7, except that the roasting temperature was raised from 400° to 800° C. during a time period of 40 minutes as indicated in Table III.

EXAMPLES 38–47

In the starting material makeup, calcined talc was used, and the experiments were carried out as in Example 7, except that the components indicated in the hereinafter given Table IV were used and the roasting temperature and time and firing temperature and time indicated therein were employed.

EXAMPLES 48-56

Calcined cordierite was used in the starting material makeup, and the experiments were carried out as in Example 7, except that the components indicated in the hereinafter given Table V and the roasting temperature and time and firing temperature and time indicated therein were used.

EXAMPLES 57-64

Calcined kaolinite was used in the starting material makeup, and the experiments were carried out as in Example 7, except that the components indicated in the hereinafter given Table VI and the roasting temperature and time and firing temperature and time indicated therein were used.

TABLE I

| Example | Starting material | Part | Roasting Temperature (°C.) | Roasting Time (hr.:min.) | Firing Temperature (°C.) | Firing Time (hr.:min.) | Density | Compressive strength (kg./cm.$^2$) |
|---|---|---|---|---|---|---|---|---|
| 15 | Petalite | 45 | -900 | 4:30 | 900 | 1:00 | 1.08 | 114.7 |
|  | Soda-lime glass | 55 |  |  |  |  |  |  |
|  | Sodium sulfate (Na$_2$SO$_4$) | 5 |  |  |  |  |  |  |
|  | White lead | 5 |  |  |  |  |  |  |
|  | Water glass (No. 3) | 25 |  |  |  |  |  |  |
| 16 | Petalite | 35 | -850 | 3:30 | 850 | 0:30 | 0.94 | 72.4 |
|  | Soda-lime glass | 65 |  |  |  |  |  |  |
|  | Sodium sulfate (Na$_2$SO$_4$) | 5 |  |  |  |  |  |  |
|  | White lead | 5 |  |  |  |  |  |  |
|  | Water glass (No. 3) | 25 |  |  |  |  |  |  |
| 17 | Petalite | 45 | -900 | 4:30 | 900 | 1:00 | 1.07 | 119.1 |
|  | Soda-lime glass | 55 |  |  |  |  |  |  |
|  | Sodium sulfate (Na$_2$SO$_4$) | 5 |  |  |  |  |  |  |
|  | Zinc white | 5 |  |  |  |  |  |  |
|  | Water glass | 25 |  |  |  |  |  |  |
| 18 | Petalite | 35 | -850 | 3:30 | 850 | 0:30 | 0.92 | 61.4 |
|  | Soda-lime glass | 65 |  |  |  |  |  |  |
|  | Sodium sulfate (Na$_2$SO$_4$) | 5 |  |  |  |  |  |  |
|  | Zinc white | 5 |  |  |  |  |  |  |
|  | Water glass | 25 |  |  |  |  |  |  |
| 19 | Petalite | 45 | -900 | 4:30 | 900 | 1:00 | 0.99 | 124.5 |
|  | Soda-lime glass | 55 |  |  |  |  |  |  |
|  | Potassium sulfate | 5 |  |  |  |  |  |  |
|  | Zinc white | 5 |  |  |  |  |  |  |
|  | Water glass | 25 |  |  |  |  |  |  |
| 20 | Petalite | 45 | -870 | 4:00 | 870 | 0:30 | 0.97 | 67.4 |
|  | Soda-lime glass | 55 |  |  |  |  |  |  |
|  | Sodium bicarbonate (NaHCO$_3$) | 5 |  |  |  |  |  |  |
|  | White lead | 5 |  |  |  |  |  |  |
|  | Water glass | 25 |  |  |  |  |  |  |
| 21 | Petalite | 45 | -900 | 4:30 | 900 | 1:00 | 1.02 | 110.6 |
|  | Soda-lime glass | 55 |  |  |  |  |  |  |
|  | Sodium bicarbonate (NaHCO$_3$) | 5 |  |  |  |  |  |  |
|  | Zinc white | 5 |  |  |  |  |  |  |
|  | Water glass | 25 |  |  |  |  |  |  |
| 22 | Petalite | 35 | -900 | 4:30 | 900 | 1:00 | 0.94 | 51.2 |
|  | Soda-lime glass | 65 |  |  |  |  |  |  |
|  | Sodium bicarbonate (NaHCO$_3$) | 5 |  |  |  |  |  |  |
|  | Zinc white | 5 |  |  |  |  |  |  |
|  | White glass | 25 |  |  |  |  |  |  |
| 23 | Petalite | 45 | -870 | 4:00 | 870 | 0:30 | 0.95 | 63.2 |
|  | Soda-lime glass | 55 |  |  |  |  |  |  |
|  | Sodium dihydrogen phosphate (NaH$_2$PO$_4$) | 5 |  |  |  |  |  |  |
|  | White lead | 5 |  |  |  |  |  |  |
|  | Water glass | 25 |  |  |  |  |  |  |
| 24 | Petalite | 35 | -850 | 3:30 | 850 | 0:30 | 0.97 | 72.5 |
|  | Soda-lime glass | 65 |  |  |  |  |  |  |
|  | Sodium dihydrogen phosphate (NaH$_2$PO$_4$) | 5 |  |  |  |  |  |  |
|  | White lead | 5 |  |  |  |  |  |  |
|  | Water glass | 25 |  |  |  |  |  |  |
| 25 | Petalite | 45 | -900 | 4:30 | 900 | 1:30 | 0.90 | 57.7 |
|  | Soda-lime glass | 55 |  |  |  |  |  |  |
|  | Sodium dihydrogen phosphate (HaH$_2$PO$_4$) | 5 |  |  |  |  |  |  |
|  | Zinc white | 5 |  |  |  |  |  |  |
|  | Water glass | 25 |  |  |  |  |  |  |
| 26 | Petalite | 35 | -850 | 3:30 | 850 | 3:30 | 0.96 | 60.8 |
|  | Soda-lime glass | 65 |  |  |  |  |  |  |
|  | Sodium dihydrogen phosphate (NaH$_2$PO$_4$) | 5 |  |  |  |  |  |  |
|  | Zinc white | 5 |  |  |  |  |  |  |
|  | Water glass | 25 |  |  |  |  |  |  |
| 27 | Petalite | 45 | -870 | 4:30 | 870 | 0:30 | 0.89 | 52.4 |
|  | Soda-lime glass | 55 |  |  |  |  |  |  |
|  | Potassium chlorate | 5 |  |  |  |  |  |  |
|  | Zinc white | 5 |  |  |  |  |  |  |
|  | Water glass | 25 |  |  |  |  |  |  |
| 16' | Product of Ex. 16 (comminuted) | 100 | -975 | 5:00 | 975 | 0:30 | 1.41 | 245.8 |
|  | Water glass (No. 3) | 40 |  |  |  |  |  |  |
| 18' | Product of Ex. 18 (comminuted) | 100 | -975 | 5:00 | 975 | 0:30 | 1.25 | 191.1 |
|  | Water glass (No. 2) | 40 |  |  |  |  |  |  |
| 19' | Product of Ex.19 (comminuted) | 100 | -820 | 4:20 | 820 | 0:50 | 1.39 | 215.8 |
|  | Water glass (No. 2) | 40 |  |  |  |  |  |  |
| 20' | Product of Ex. 20 (comminuted) | 100 | -820 | 3:40 | 820 | 0:50 | 0.99 | 121.4 |
|  | Water glass (No. 2) | 40 |  |  |  |  |  |  |
| 21' | Product of Ex. 21 (commuted) | 100 | -820 | 3:20 | 820 | 0:50 | 1.10 | 254.1 |
|  | Water glass (No. 2) | 40 |  |  |  |  |  |  |
| 23' | Product of Ex. 23 (comminuted) | 100 | -820 | 3:40 | 820 | 0:50 | 1.18 | 89.0 |
|  | Water glass (No. 2) | 40 |  |  |  |  |  |  |
| 25' | Product of Ex. 25 (comminuted) | 100 | -975 | 5:00 | 975 | 0:30 | 0.90 | 145.5 |
|  | Water glass (No. 2) | 40 |  |  |  |  |  |  |
| 27' | Product of Ex. 27 (commuted) | 100 | -820 | 3:40 | 820 | 0:50 | 1.27 | 404.7 |
|  | Water glass (No. 2) | 40 |  |  |  |  |  |  |

TABLE II

| Example | Starting material | Part | Roasting Temperature (° C.) | Roasting Time (hr.:min.) | Firing Temperature (° C.) | Firing Time (hr.:min.) | Density | Compressive strength (kg./cm.²) |
|---|---|---|---|---|---|---|---|---|
| 29 | Petalite | 40 | -920 | 4:40 | 920 | 1:00 | 1.37 | 152.9 |
|    | Soda-lime glass | 60 | | | | | | |
|    | Sodium bisulfate (NaHSO⁴) | 5 | | | | | | |
|    | Zinc white | 5 | | | | | | |
|    | Water glass | 25 | | | | | | |
| 30 | Petalite | 40 | -910 | 4:40 | 910 | 1:00 | 1.25 | 150.2 |
|    | Soda-lime glass | 60 | | | | | | |
|    | Potassium bisulfite | 5 | | | | | | |
|    | Zinc white | 5 | | | | | | |
|    | Water glass | 25 | | | | | | |
| 31 | Petalite | 40 | -910 | 4:40 | 910 | 1:00 | 1.28 | 131.7 |
|    | Soda-lime glass | 60 | | | | | | |
|    | Potassium bicarbonate | 5 | | | | | | |
|    | Zinc white | 5 | | | | | | |
|    | Water glass | 25 | | | | | | |
| 32 | Petalite | 0 | -850 | 3:30 | 850 | 0:30 | 1.12 | 96.4 |
|    | Soda-lime glass | 60 | | | | | | |
|    | Potassium thiosulfate | 5 | | | | | | |
|    | Zinc white | 5 | | | | | | |
|    | Water glass | 25 | | | | | | |
| 33 | Petalite | 40 | -870 | 4:40 | 870 | 0:30 | 0.91 | 51.4 |
|    | Soda-lime glass | 60 | | | | | | |
|    | Sodium chlorate | 5 | | | | | | |
|    | Zinc white | 5 | | | | | | |
|    | Water glass | 25 | | | | | | |
| 34 | Petalite | 40 | -910 | 4:40 | 910 | 1:00 | 1.30 | 185.2 |
|    | Soda-lime glass | 60 | | | | | | |
|    | Potassium nitrate | 5 | | | | | | |
|    | Zinc white | 5 | | | | | | |
|    | Water glass | 25 | | | | | | |

TABLE III

| Example | Starting material | Part | Roasting Temperature (° C.) | Roasting Time (hr.:min.) | Firing Temperature (° C.) | Firing Time (hr.:min.) | Density | Compressive strength (kg./cm.²) |
|---|---|---|---|---|---|---|---|---|
| 35 | Petalite | 45 | 400-800 | 0:40 | 800 | 0:40 | 1.17 | 95.3 |
|    | Soda-lime glass | 55 | | | | | | |
|    | Sodium sulfate | 5 | | | | | | |
|    | Zinc white | 5 | | | | | | |
|    | Water glass | 25 | | | | | | |
| 36 | Petalite | 45 | 400-800 | 0:40 | 800 | 0:40 | 1.05 | 195.2 |
|    | Sodium-lime glass | 55 | | | | | | |
|    | Potassium sulfate | 5 | | | | | | |
|    | Zinc white | 5 | | | | | | |
|    | Water glass | 25 | | | | | | |
| 37 | Petalite | 45 | -870 | 4:00 | 870 | 0.30 | 1.31 | 65.1 |
|    | Quartz glass | 55 | | | | | | |
|    | Sodium carbonate | 5 | | | | | | |
|    | Zinc white | 5 | | | | | | |
|    | Water glass | 25 | | | | | | |
| 35′ | Product of Ex. 35 (communited) | 100 | -975 | 5:00 | 975 | 0:30 | 1.46 | 343.2 |
|    | Water glass (No. 2) | 40 | | | | | | |

TABLE IV

| Example | Starting material | Part | Roasting Temperature (° C.) | Roasting Time (hr.:min.) | Firing Temperature (° C.) | Firing Time (hr.:min.) | Density | Compressive strength (kg./cm.²) |
|---|---|---|---|---|---|---|---|---|
| 38 | Calcined talc | 45 | -850 | 3:30 | 850 | 0:30 | 1.11 | 132.4 |
|    | Lead glass | 55 | | | | | | |
|    | Potassium nitrate | 5 | | | | | | |
|    | White lead | 5 | | | | | | |
|    | Water glass | 25 | | | | | | |
| 39 | Calcined talc | 35 | -900 | 4:30 | 900 | 1:00 | 0.91 | 66.6 |
|    | Lead glass | 65 | | | | | | |
|    | Potassium nitrate | 5 | | | | | | |
|    | White lead | 5 | | | | | | |
|    | Water glass | 25 | | | | | | |
| 40 | Calcined talc | 45 | -900 | 4:30 | 900 | 1:00 | 1.31 | 99.4 |
|    | Lead glass | 55 | | | | | | |
|    | Potassium nitrate | 5 | | | | | | |
|    | Zinc white | 5 | | | | | | |
|    | Water glass | 25 | | | | | | |
| 41 | Calcined talc | 35 | -870 | 4:00 | 870 | 0:30 | 0.97 | 76.1 |
|    | Lead glass | 65 | | | | | | |
|    | Potassium nitrate | 5 | | | | | | |
|    | Zinc white | 5 | | | | | | |
|    | Water glass | 25 | | | | | | |
| 42 | Calcined talc | 45 | -870 | 4:00 | 870 | 0:30 | 0.91 | 50.0 |
|    | Lithia-alumina-silica glass | 55 | | | | | | |
|    | Potassium nitrate | 5 | | | | | | |
|    | White lead | 5 | | | | | | |
|    | Water glass | 25 | | | | | | |
| 43 | Calcined talc | 35 | -900 | 4:30 | 900 | 1:00 | 1.18 | 122.3 |
|    | Alumina-silicate glass | 65 | | | | | | |
|    | Sodium carbonate | 5 | | | | | | |
|    | Zinc white | 5 | | | | | | |
|    | Water glass | 25 | | | | | | |
| 44 | Calcined talc | 45 | -900 | 4:30 | 900 | 1:00 | 1.14 | 92.2 |
|    | Alumina-borosilicate glass | 55 | | | | | | |
|    | Sodium chlorate | 5 | | | | | | |
|    | White lead | 5 | | | | | | |
|    | Water glass | 25 | | | | | | |

TABLE IV—Continued

| Example | | Part | Roasting Temperature (° C.) | Roasting Time (hr.:min.) | Firing Temperature (° C.) | Firing Time (hr.:min.) | Density | Compressive strength (kg./cm.²) |
|---|---|---|---|---|---|---|---|---|
| 45 | Calcined talc | 35 | -900 | 4:30 | 900 | 1:00 | 1.18 | 97.0 |
| | Alumina-borosilicate glass | 65 | | | | | | |
| | Sodium chlorate | 5 | | | | | | |
| | White lead | 5 | | | | | | |
| | Water glass | 25 | | | | | | |
| 46 | Calcined talc | 45 | -900 | 4:30 | 900 | 1:00 | 1.30 | 72.3 |
| | Alumina-borosilicate glass | 55 | | | | | | |
| | Sodium chlorate | 5 | | | | | | |
| | Zinc white | 5 | | | | | | |
| | Water glass | 25 | | | | | | |
| 47 | Calcined talc | 35 | -900 | 4:30 | 900 | 1:00 | 1.17 | 111.5 |
| | Alumina-borosilicate glass | 65 | | | | | | |
| | Sodium chlorate | 5 | | | | | | |
| | Zinc white | 5 | | | | | | |
| | Water glass | 25 | | | | | | |
| 38′ | Product of Ex. 38 (comminuted) | 100 | -850 | 4:30 | 850 | 0:30 | 1.49 | 328.6 |
| | Water glass (No. 2) | 40 | | | | | | |
| 44′ | Product of Ex. 44 (comminuted) | 100 | -975 | 5:00 | 975 | 0:30 | 1.50 | 520.5 |
| | Water glass (No. 2) | 40 | | | | | | |
| 45′ | Product of Ex. 45 (comminuted) | 100 | -850 | 1:30 | 850 | 0:30 | 1.27 | 127.9 |
| | Water glass (No. 2) | 40 | | | | | | |
| 46′ | Product of Ex. 46 (comminuted) | 100 | -850 | 2:20 | 850 | 0:30 | 1.38 | 292.9 |
| | Water glass (No. 2) | | | | | | | |
| 47′ | Product of Ex. 47 (comminuted) | 100 | -850 | 2:20 | 850 | 0:30 | 1.29 | 167.6 |
| | Water glass (No. 2) | | | | | | | |

TABLE V

| Example | | Part | Roasting Temperature (° C.) | Roasting Time (hr.:min.) | Firing Temperature (° C.) | Firing Time (hr.:min.) | Density | Compressive strength (kg./cm.²) |
|---|---|---|---|---|---|---|---|---|
| 48 | Starting material: Calcined cordierite | 45 | -900 | 4:30 | 900 | 1:00 | 1.11 | 143.0 |
| | Alumina-borosilicate glass | 55 | | | | | | |
| | Potassium carbonate | 5 | | | | | | |
| | White lead | 5 | | | | | | |
| | Water glass | 25 | | | | | | |
| 49 | Calcined cordierite | 35 | -900 | 4:30 | 900 | 1:00 | 0.90 | 52.9 |
| | Alumina-borosilicate glass | 65 | | | | | | |
| | Potassium carbonate | 5 | | | | | | |
| | White lead | 5 | | | | | | |
| | Water glass | 25 | | | | | | |
| 50 | Calcined cordierite | 45 | -900 | 4:30 | 900 | 1:00 | 0.95 | 145.1 |
| | Alumina-borosilicate glass | 55 | | | | | | |
| | Potassium carbonate | 5 | | | | | | |
| | Zinc white | 5 | | | | | | |
| | Water glass | 24 | | | | | | |
| 51 | Calcined cordierite | 35 | -900 | 4:30 | 900 | 1:00 | 0.91 | 128.9 |
| | Alumina-borosilicate glass | 65 | | | | | | |
| | Potassium carbonate | 5 | | | | | | |
| | Zinc white | 5 | | | | | | |
| | Water glass | 25 | | | | | | |
| 52 | Calcined cordierite | 45 | -870 | 4:00 | 870 | 0:30 | 1.28 | 160.6 |
| | Alumina-borosilicate glass | 55 | | | | | | |
| | Potassium chlorate | 5 | | | | | | |
| | White lead | 5 | | | | | | |
| | Water glass | 25 | | | | | | |
| 53 | Calcined cordierite | 35 | -850 | 3:30 | 850 | 0:30 | 1.32 | 118 |
| | Alumina-borosilicate glass | 65 | | | | | | |
| | Potassium chlorate | 5 | | | | | | |
| | White lead | 5 | | | | | | |
| | Water glass | 25 | | | | | | |
| 54 | Calcined cordierite | 35 | -850 | 3:30 | 850 | 0:30 | 1.22 | 122.5 |
| | Alumina-borosilicate glass | 65 | | | | | | |
| | Potassium chlorate | 5 | | | | | | |
| | Zinc white | 5 | | | | | | |
| | Water glass | 25 | | | | | | |
| 55 | Calcined cordierite | 40 | -870 | 4:00 | 870 | 0:30 | 1.28 | 153.7 |
| | Alumina-borosilicate glass | 60 | | | | | | |
| | Sodium thiosulfate ($Na_2S_2O_3$) | 5 | | | | | | |
| | Zinc white | 5 | | | | | | |
| | Water glass | 25 | | | | | | |
| 56 | Calcined cordierite | 40 | -850 | 3:30 | 850 | 0:30 | 1.32 | 126.4 |
| | Lithia-alumina-silicate glass | 60 | | | | | | |
| | Sodium thiosulfate ($Na_2S_2O_3$) | 5 | | | | | | |
| | Zinc white | 5 | | | | | | |
| | Water glass | 25 | | | | | | |
| 48′ | Product of Ex. 48 (comminuted) | 100 | -820 | 4:30 | 820 | 0:50 | 1.60 | 521.0 |
| | Water glass (No. 2) | 40 | | | | | | |
| 49′ | Product of Ex. 49 (comminuted) | 100 | -820 | 4:30 | 820 | 0:50 | 1.27 | 143.9 |
| | Water glass (No. 2) | 40 | | | | | | |
| 50′ | Product of Ex. 50 (comminuted) | 100 | -820 | 4:30 | 820 | 0:50 | 1.59 | 277.0 |
| | Water glass (No. 2) | 40 | | | | | | |
| 52′ | Product of Ex. 52 (comminuted) | 100 | -850 | 2:20 | 850 | 0:30 | 1.66 | 373.4 |
| | Water glass (No. 2) | 40 | | | | | | |
| 53′ | Product of Ex. 53 (comminuted) | 100 | -850 | 2:20 | 850 | 0:30 | 1.62 | 272.0 |
| | Water glass (No. 2) | 40 | | | | | | |
| 54′ | Product of Ex. 54 (comminuted) | 100 | -850 | 2:20 | 850 | 0:30 | 1.60 | 336.0 |
| | Water glass (No. 2) | 40 | | | | | | |

TABLE VI

| Example | Starting material: | Part | Roasting Temperature (° C.) | Roasting Time (hr.:min.) | Firing Temperature (° C.) | Firing Time (hr.:min.) | Density | Compressive strength (kg./cm.²) |
|---|---|---|---|---|---|---|---|---|
| 57 | Calcined kaolinite<br>Lead glass<br>Sodium nitrate<br>Zinc white<br>Water glass | 45<br>45<br>5<br>5<br>25 | -900 | 4:30 | 900 | 1:00 | 0.84 | 107.1 |
| 58 | Calcined kaolinite<br>Lead glass<br>Sodium nitrate<br>White lead<br>Water glass | 45<br>55<br>5<br>5<br>25 | -850 | 3:30 | 850 | 0:30 | 0.94 | 54.6 |
| 59 | Calcined kaolinite<br>Alumina-silicate glass<br>Potassium nitrate<br>Zinc white<br>Water glass | 45<br>55<br>5<br>5<br>25 | -900 | 4:30 | 900 | 1:00 | 0.91 | 59.0 |
| 60 | Calcined kaolinite<br>Alumina-silicate glass<br>Potassium nitrate<br>White lead<br>Water glass | 45<br>55<br>5<br>5<br>25 | -900 | 4:30 | 900 | 1:00 | 0.90 | 98.3 |
| 61 | Calcined kaolinite<br>Quartz glass<br>Sodium carbonate<br>Zinc white<br>Water glass | 45<br>55<br>5<br>5<br>25 | -850 | 3:30 | 850 | 1:00 | 1.29 | 48.8 |
| 62 | Calcined kaolinite<br>Lead glass<br>Sodium carbonate<br>Zinc white<br>Water glass | 35<br>65<br>5<br>5<br>25 | -850 | 3:30 | 850 | 0:30 | 1.01 | 88.2 |
| 63 | Calcined kaolinite<br>Alumina-silicate glass<br>Sodium thiosulfate ($Na_2S_2O_3$)<br>Zinc white<br>Water glass | 40<br>60<br>5<br>5<br>25 | -850 | 3:30 | 850 | 0:30 | 1.05 | 99.1 |
| 64 | Calcined kaolinite<br>Lithia-alumina-silicate glass<br>Sodium thiosulfate ($Na_2S_2O_3$)<br>Zinc white<br>Water glass | 40<br>60<br>5<br>5<br>25 | -850 | 3:30 | 850 | 0:30 | 1.19 | 114.9 |
| 57' | Product of Ex. 57 (comminuted)<br>Water glass (No. 2) | 100<br>40 | -850 | 2:20 | 850 | 0:30 | 1.02 | 241.6 |
| 59' | Product of Ex. 59 (comminuted)<br>Water glass (No. 2) | 100<br>40 | -850 | 1:30 | 850 | 0:30 | 1.48 | 163.4 |
| 61' | Product of Ex. 61 (comminuted)<br>Water glass (No. 2) | 100<br>40 | -850 | 2:20 | 850 | 0:30 | 0.72 | 132.6 |

I claim:

1. A process for the manufacture of foamed porcelain-like shaped articles which comprises mixing, per 100 parts by weight of the total components, (A) 50 to 95 parts by weight of at least one aggregate component selected from the group consisting of silicate mineral powder and a mixture of silicate glass powder and silicate mineral powder; (B) 5 to 40 parts by weight of a water glass component; (C) an inorganic alkali salt component which generates a gas by substantially decomposing at the firing temperature, said inorganic alkali salt component being selected from the group consisting of alkali metal salts of carbonic acid, sulfuric acid, sulfurous acid, thiosulfuric acid, nitric acid, nitrous acid, phosphoric acid and chloric acid, and being used in an amount of (a) 10 to 30 parts by weight when said aggregate component is a silicate mineral powder, and (b) 1 to 15 parts by weight when said aggregate component is a mixture of said silicate mineral powder and silicate glass powder; and (D) a component for adjusting the foaming temperature, said component selected from the group consisting of (a) at least one mineral powder selected from the group consisting of lead oxide and zinc white and used in an amount of 0.1 to 25 parts by weight and (b) at least one mineral powder selected from the group consisting of a magnesia compound selected from the group consisting of magnesite, brucite, magnesia clinker and spinel and a calcium compound selected from the group consisting of dolomite, dolomite clinker, calcite and gypsum and used in an amount of 0.1 to 9 parts by weight; molding the resulting mixture; and thereafter firing and foaming the resulting shaped article at a temperature between 700° and 1200° C.

2. The process according to claim 1 wherein said silicate glass powder is selected from the group consisting of the powders of soda-lime glass, lead glass, barium glass, borosilicate glass, alumina-silicate glass, lithia-alumina-silicate glass and quartz glass.

3. The process according to claim 1 wherein said silicate mineral powder is selected from the group consisting of the powders of quartz sand, silica, olivine, garnet, petalite, beryl, cordierite, pyroxene, amphibole, talc, pyrophyllite, mica, chlorite, chrysotile, antigolite, kaolin, toseki, allophane, feldspar, aplite, zeolite, alunite, obsidianie and shale.

4. The process according to claim 1 wherein said at least one aggregate component is used in an amount of 60 to 90 parts by weight, said water glass component is used in an amount of 15 to 35 parts by weight, said inorganic alkali salt component which generates a gas by substantially decomposing at the firing temperature is used in an amount of 15 to 25 parts by weight when said aggregate component is said silicate mineral powder, and 1 to 10 parts by weight when said aggregate component is a mixture of said silicate mineral and silicate glass powders, and said component for adjusting the foaming temperature is 0.2 to 20 parts by weight of at least one mineral powder selected from the group consisting of lead oxide and zinc white and 0.2 to 6 parts by weight of at least one mineral powder selected from the group consisting of said magnesia compounds and said calcium compound.

5. The process according to claim 1 wherein said silicate glass powder is selected from the powders of soda-lime glass, barium glass and borosilicate glass, said silicate mineral powder is selected from the powders of quartz sand, silica, zeolite, toseki, feldspar and splite, said inorganic alkali salt component is selected from sodium bicarbonate, sodium carbonate, sodium bisulfate, sodium sulfate and sodium thiosulfate.

6. The process according to claim 1 wherein the temperature at which said firing and foaming are carried out is from 750° to 1000° C.

7. The process according to claim 1 wherein, in raising the temperature to that at which the firing and foaming are to be carried out, roasting of the shaped article is carried out during a time period between 40 minutes and 6 hours.

8. The process according to claim 1 wherein said shaped article is dried prior to its firing and foaming to evaporate the moisture therefrom.

9. The process according to claim 1 wherein the particle diameters of the several components of (A), (B), (C) and (D) are not greater than 1.00 mm.

10. A process for the manufacture of foamed porcelain-like shaped articles which comprises mixing, per 100 parts by weight of the total components, (A) 50 to 95 parts by weight of at least one aggregate component selected from the group consisting of silicate mineral powder and a mixture of silicate glass powder and silicate mineral powder; (B) 5 to 40 parts by weight of a water glass component; (C) an inorganic alkali salt component which generates a gas by substantially decomposing at the firing temperature, said inorganic alkali salt component being selected from the group consisting of alkali metal salts of carbonic acid, sulfuric acid, sulfurous acid, thiosulfuric acid, nitric acid, nitrous acid, phosphoric acid and chloric acid, and being used in an amount of (a) 10 to 30 parts by weight when said aggregate component is a silicate mineral powder, and (b) 1 to 15 parts by weight when said aggregate component is a mixture of said silicate mineral powder and silicate glass powder; and (D) a component for adjusting the foaming temperature, said component selected from the group consisting of (a) at least one mineral powder selected from the group consisting of lead oxide and zinc white and used in an amount of 0.1 to 25 parts by weight and (b) at least one mineral powder selected from the group consisting of a magnesia compound selected from the group consisting of magnesite, brucite, magnesia clinker and spinel and a calcium compound selected from the group consisting of dolomite, dolomite clinker, calcite and gypsum and used in an amount of 0.1 to 9 parts by weight; molding the resulting mixture; and thereafter firing and foaming the resulting shaped article at a temperature between 700° and 1200° C.; followed by comminuting the resulting foamed porcelain-like shaped article; then admixing with the comminuted product a water glass component in an amount such that the latter is 5 to 30 parts by weight per 100 parts by weight of the sum of said comminuted product and said water glass component and further such that the total content of the water glass component ranges between 5 and 40 parts by weight of the total components; molding the resulting mixture; and thereafter again firing and foaming the shaped article thus obtained at a temperature ranging between 700° and 1200° C.

11. The process according to claim 10 wherein said silicate glass powder is selected from the powders of soda-lime glass, lead glass, barium glass, borosilicate glass, alumina-silicate glass, lithia-alumina-silicate glass and quartz glass.

12. The process according to claim 10 wherein said silicate mineral powder is selected from the powders of quartz sand, silica, olivine, garnet, petalite, beryl, cordierite, pyroxene, amplibole, talc, pyrophyllite, mica, chlorite, chrysotile, antigolite, kaolin, toseki, allophane, feldspar, aplite, zeolite, alunite, obsidianie and shale.

13. The process according to claim 11 wherein said at least one aggregate component is used in an amount of 60 to 90 parts by weight, said water glass component is used in an amount of 15 to 35 parts by weight, said inorganic alkali salt component is used in an amount of 15 to 25 parts by weight when said aggregate component is said silicate mineral powder, and 1 to 10 parts by weight when said aggregate component is a mixture of said silicate mineral and silicate glass powders, said component for adjusting the foaming temperature is 0.2 to 20 parts by weight of at least one mineral powder selected from the group consisting of lead oxide and zinc white and 0.2 to 6 parts by weight of at least one mineral powder selected from the group consisting of said magnesia compounds and said calcium compounds, said water glass component added to the comminuted product of the foamed porcelain-like shaped article is used in an amount such that the amount of said water glass component is 5 to 30 parts by weight per 100 parts by weight of the sum of said comminuted product and said water glass component and further such that the total content of the water glass component ranges between 5 and 30 parts by weight per 100 parts by weight of the total components.

14. The process according to claim 10 wherein said silicate glass powder is selected from the powders of soda-lime glass, barium glass and borosilicate glass, said silicate mineral powder is selected from the powders of quartz sand, silica, zeolite, toseki, feldspar and aplite, said inorganic alkali salt component is selected from sodium bicarbonate, sodium carbonate, sodium bisulfite, sodium sulfate and sodium thiosulfate.

15. The process according to claim 10 wherein the temperature at which said firing and foaming are carried out is from 750° to 1000° C.

16. The process according to claim 10 wherein, in raising the temperature to that at which the firing and foaming are to be carried out, roasting of the shaped article is carried out during a time period between 40 minutes and 6 hours.

17. The process according to claim 10 wherein said shaped article is dried prior to its firing and foaming to evaporate the moisture therefrom.

18. The process according to claim 10 wherein the particle diameters of the several components of (A), (B), (C), (D) and comminuted product of said foamed porcelain-like shaped article are not greater than 1.00 mm.

References Cited
UNITED STATES PATENTS

| | | | |
|---|---|---|---|
| 2,978,340 | 4/1961 | Veach et al. | 106—40 R |
| 3,203,813 | 8/1965 | Gajardo et al. | 106—40 R |
| 3,321,414 | 5/1967 | Vieli | 65—22 X |
| 3,623,897 | 11/1971 | Wojeik | 106—40 V X |

ROBERT L. LINDSAY, JR., Primary Examiner

U.S. Cl. X.R.

106—40 R, 40 V